United States Patent
Restaino, III et al.

(10) Patent No.: US 11,078,642 B2
(45) Date of Patent: Aug. 3, 2021

(54) COUPLER PUSH DOWN EJECT LEVER

(71) Applicant: CNH Industrial America LLC, New Holland, PA (US)

(72) Inventors: Gerard Restaino, III, Dolton, IL (US); Jerry L. Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 376 days.

(21) Appl. No.: 16/032,374

(22) Filed: Jul. 11, 2018

(65) Prior Publication Data
US 2020/0018036 A1 Jan. 16, 2020

(51) Int. Cl.
| F16L 37/22 | (2006.01) |
| E02F 3/36 | (2006.01) |
| F16L 37/107 | (2006.01) |
| F16L 37/14 | (2006.01) |

(52) U.S. Cl.
CPC .......... *E02F 3/3622* (2013.01); *E02F 3/3654* (2013.01); *E02F 3/3663* (2013.01); *F16L 37/107* (2013.01); *F16L 37/146* (2013.01); *F16L 37/22* (2013.01)

(58) Field of Classification Search
CPC . F16L 37/22; F16L 37/30; F16L 37/33; F16L 37/002; F16L 37/086; F16L 37/23
USPC ................................................ 285/312, 308
See application file for complete search history.

(56) References Cited

U.S. PATENT DOCUMENTS

| 695,839 | A | * | 3/1902 | Roberts et al. | ....... F16L 37/256 |
| | | | | | 137/596.2 |
| 2,533,640 | A | * | 12/1950 | Ulrich | ..................... F16L 37/33 |
| | | | | | 137/614.04 |
| 2,885,905 | A | | 5/1959 | Larkin | |
| 2,906,311 | A | * | 9/1959 | Boyd | ..................... F16B 21/165 |
| | | | | | 411/105 |
| 3,130,749 | A | * | 4/1964 | Wittren | .................... F16L 37/23 |
| | | | | | 137/614 |
| 3,214,195 | A | * | 10/1965 | Zahuranec | ............... F16L 37/23 |
| | | | | | 285/27 |
| 3,385,942 | A | | 5/1968 | McCann | |
| 3,881,514 | A | * | 5/1975 | Berg | ....................... F16L 37/30 |
| | | | | | 137/614.04 |
| 3,924,493 | A | | 12/1975 | Penner | |
| 3,942,828 | A | * | 3/1976 | Bourrie | ............... E05B 17/2011 |
| | | | | | 292/201 |
| 3,953,697 | A | | 4/1976 | Teichert | |
| 4,016,914 | A | * | 4/1977 | Zurko | .................... F16B 5/0208 |
| | | | | | 411/105 |
| 4,071,271 | A | * | 1/1978 | Bourrie | ............... E05B 47/0002 |
| | | | | | 292/201 |
| 4,111,477 | A | * | 9/1978 | Rigali | .................. E05B 65/1033 |
| | | | | | 292/252 |

(Continued)

FOREIGN PATENT DOCUMENTS

GB 427735 4/1935

*Primary Examiner* — David Bochna
(74) *Attorney, Agent, or Firm* — Rickard K. DeMille; Rebecca L. Henkel

(57) ABSTRACT

A vehicle including a coupling device having a male coupler with a release pin and a female coupler having a female housing with a recess for removably connecting the male coupler. The coupling device further includes a mechanical ejector moveably connected to the female housing and configured for depressing the release pin for ejecting the male coupler from the female housing.

16 Claims, 3 Drawing Sheets

(56) References Cited

U.S. PATENT DOCUMENTS

| | | | |
|---|---|---|---|
| 4,149,052 A | 4/1979 | Piber | |
| 4,237,629 A | 12/1980 | Schmidt | |
| 4,269,219 A * | 5/1981 | Dybvig | F16L 37/33 137/322 |
| 4,303,098 A | 12/1981 | Shindelar | |
| 4,371,004 A * | 2/1983 | Sysolin | F16L 37/33 137/614.04 |
| 4,485,845 A | 12/1984 | Brady | |
| 4,676,269 A * | 6/1987 | Sarson | F16L 37/22 137/614.06 |
| 4,808,777 A | 2/1989 | Kindberg et al. | |
| 4,850,774 A * | 7/1989 | Weaver | F16B 39/04 411/298 |
| 4,870,230 A | 9/1989 | Osika et al. | |
| 4,962,682 A | 10/1990 | Rose et al. | |
| 5,316,033 A * | 5/1994 | Schumacher | F16L 37/23 137/614 |
| 5,424,500 A | 6/1995 | Smith | |
| 5,558,210 A | 9/1996 | Jonischus | |
| 5,931,446 A | 8/1999 | Vandelinde | |
| 6,062,112 A | 5/2000 | Bonniot | |
| 6,799,747 B1 * | 10/2004 | Lai | F16L 37/33 137/614.04 |
| 8,198,561 B2 | 6/2012 | Godesa | |
| 8,667,643 B2 | 3/2014 | Simonelli et al. | |
| 9,700,407 B2 | 7/2017 | Safabash | |
| 2017/0321836 A1 * | 11/2017 | Danelli | F16L 37/23 |
| 2017/0343128 A1 * | 11/2017 | Chiu | F16L 37/23 |
| 2019/0145561 A1 * | 5/2019 | Canzi | F16L 37/44 251/149 |

* cited by examiner

COUPLER PUSH DOWN EJECT LEVER

FIELD OF THE INVENTION

The present invention pertains to vehicles and, more specifically, to vehicles with hydraulic couplers.

BACKGROUND OF THE INVENTION

Agricultural and industrial work vehicles may include various fluid coupling devices to facilitate the removable attachment of a hydraulic system of a tool or implement. A vehicle, such as a tractor or backhoe, may include the hydraulic supply, hydraulic pumps, female hydraulic couplers, and fluid lines. The tool or implement may include male hydraulic couplers, hydraulic actuators, and fluid lines in order to perform specific tasks. The female hydraulic couplers receive the male hydraulic couplers from the tool or implement to connect the hydraulic plumbing of the vehicle to the tool or implement. The hydraulic connection between the vehicle and the tool or implement may have a quick-connect feature in which an operator can readily and efficiently couple the female and male couplers together.

For example, it is known to include lever-operated female couplers or push-pull (dis)connect female couplers in order to quickly and efficiently couple the tool or implement to the vehicle. Some lever-operated female couplers, such as disclosed in U.S. Pat. No. 4,303,098, have lever actuatable cams with an arm that can be lifted to allow insertion and removal of the male coupler. Some push-pull (dis)connect female couplers, for instance as taught in U.S. Pat. No. 4,485,845, include outer sleeves and a generally tubular housing that axially slides relative to the outer sleeve in order to couple or uncouple the male coupler. However, such prior art coupling devices do not efficiently aid in ejecting the male coupler from the female coupler.

What is needed in the art is a hydraulic coupling device that efficiently and cost-effectively helps eject a male hydraulic coupler from a female hydraulic coupler.

SUMMARY OF THE INVENTION

In one exemplary embodiment formed in accordance with the present invention, there is provided a female coupler with a female housing with a bore and a recess for removably connecting a male coupler with a release pin. The female coupler also has a mechanical ejector that is moveably connected to the female housing. The mechanical ejector includes a lever pivotally connected to the female housing at a first pivot point and a rod pivotally connected to the lever at a second pivot point rearwardly of the first pivot point. The rod has a bulbous end that contacts and depresses the release pin of the male coupler when the rod is moved upwardly by pushing downwardly on the proximal end of the lever.

In another exemplary embodiment formed in accordance with the present invention, there is provided a vehicle including a coupling device. The coupling device includes a male coupler having a release pin, a female coupler having a female housing with a recess for removably connecting the male coupler, and a mechanical ejector moveably connected to the female housing and configured for depressing the release pin for ejecting the male coupler from the female housing.

In yet another exemplary embodiment formed in accordance with the present invention, there is provided a coupling device for coupling a male coupler with a release pin. The coupling device includes a female coupler having a female housing with a recess configured for removably connecting the male coupler, and a mechanical ejector moveably connected to the female housing and configured for depressing the release pin for ejecting the male coupler from the female housing.

In yet another exemplary embodiment formed in accordance with the present invention, there is provided a method including the step of providing a vehicle having a coupling device. The coupling device including a male coupler having a release pin, a female coupler having a female housing with a bore and a recess for removably connecting the male coupler, and a mechanical ejector including a lever pivotally connected to the female housing at a first pivot point and a rod pivotally connected to the lever at a second pivot point located rearwardly of the first pivot point and being disposed and slideable within the bore of the female housing. The method also includes the steps of moving the lever downwardly to correspondingly move the rod upwardly such that the rod depresses the release pin of the male coupler, and ejecting the male coupler from the female housing of the female coupler.

One possible advantage of the exemplary embodiment of the vehicle is that the mechanical ejector of the coupling device provides a mechanical aid for ejecting the couplers.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
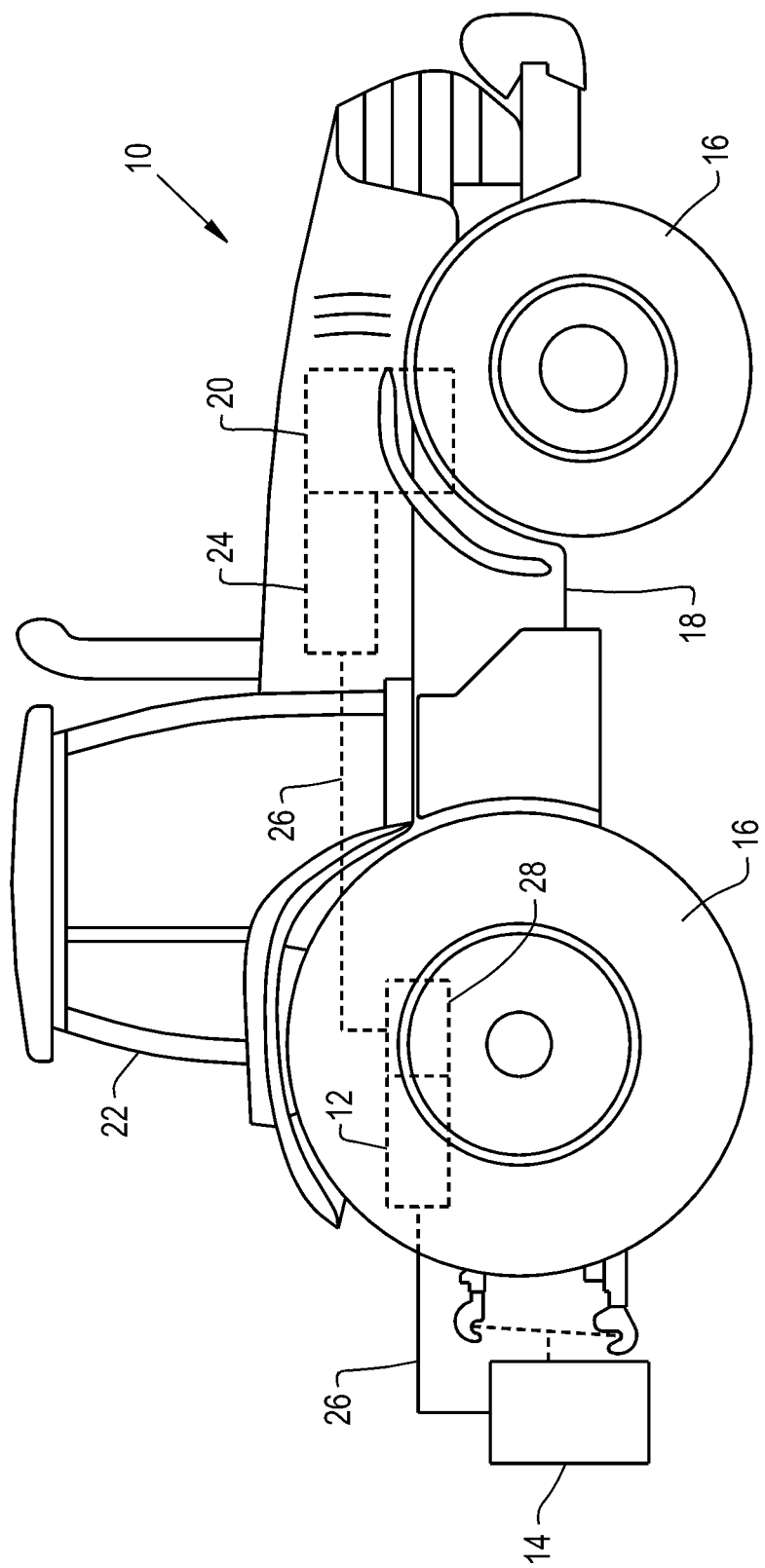
FIG. 1 illustrates a side view of an exemplary embodiment of an agricultural vehicle, the agricultural vehicle including a coupling device with a male coupler and a female coupler that has a mechanical ejector, in accordance with an exemplary embodiment of the present invention.

Referring now to the drawings, and more specifically to FIG. 1, there is shown a vehicle 10 which includes a coupling device 12 for fluidly coupling the vehicle 10 to a tool or implement 14. As shown, the vehicle 10 is an agricultural tractor 10 with an implement 14; however, the vehicle 10 may be in the form of any desired agricultural vehicle or industrial work vehicle. The implement 14 can be in the form of any desired work tool or implement, such as a bucket, a back hoe, a planter, etc., that has hydraulics, and it may be coupled to the vehicle 10 at any desired location. The agricultural tractor 10 generally includes wheels 16, supporting a chassis 18, a prime mover 20, a cab 22, and a hydraulic fluid source 24. The agricultural tractor 10 may also include a hydraulic pump (not shown) and hydraulic plumb lines 26 which fluidly connect the hydraulic fluid source 24 to the coupling device 12 and the coupling device 12 to the implement 14, respectively. A valve 28 may be integral within the coupling device 12, or separately coupled therewith, for controlling the inflow and outflow of fluid between the hydraulic fluid source 24 and the implement 14.

Figure 2:
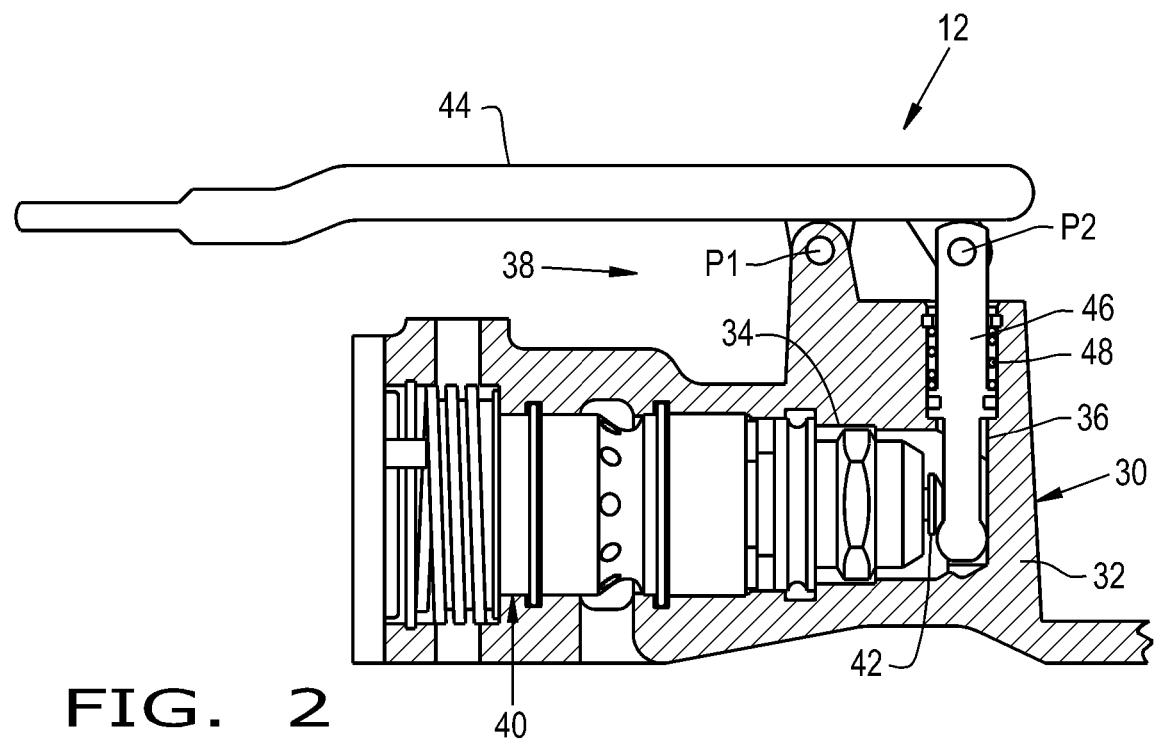
FIG. 2 illustrates a side view of the coupling device in a neutral position, in accordance with an exemplary embodiment of the present invention.
Figure 3:
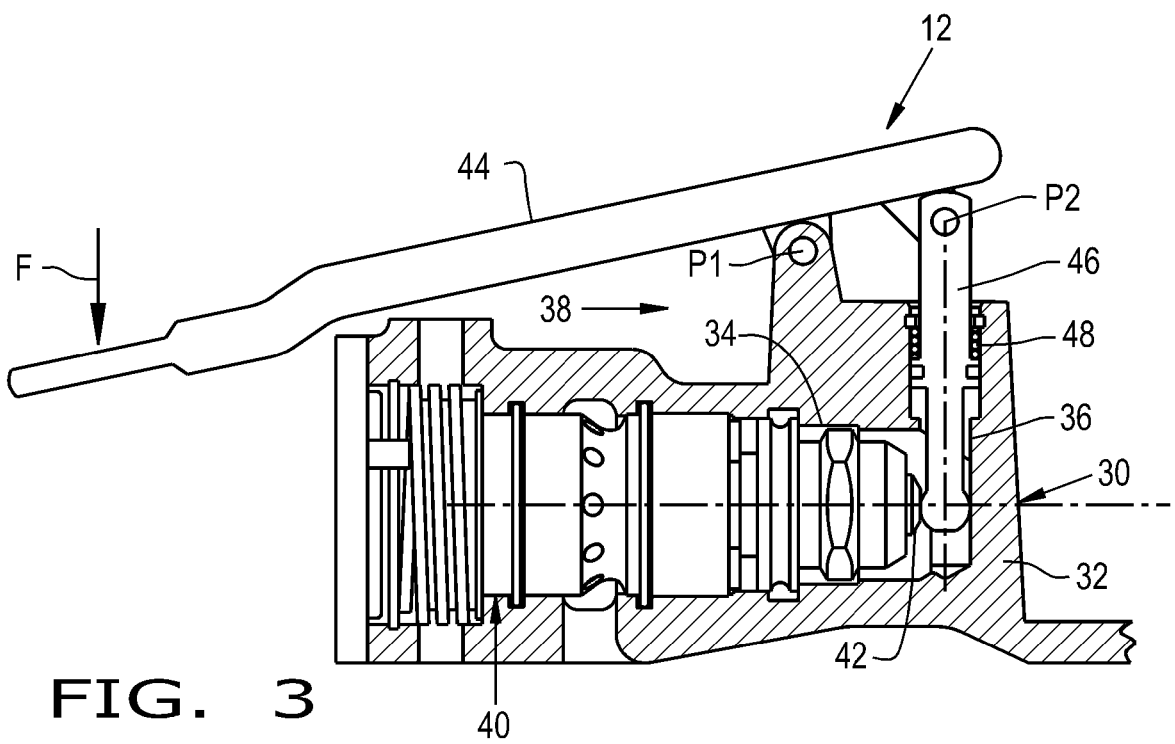
FIG. 3 illustrates a side view of the coupling device in an actuated position, in accordance with an exemplary embodiment of the present invention.

Referring now collectively to FIGS. 1-3, the coupling device 12 generally includes a female coupler 30 having a female housing 32 with a recess 34 and a bore 36, and a mechanical ejector 38 movably connected to the female housing 32. The bore 36 is substantially perpendicular to the recess 34, for example, the bore 36 can be positioned 90 degrees relative to the longitudinal axis of the recess 34, ±10 degrees. When the implement 14 is coupled to the agricultural vehicle 10, the coupling device 12 additionally includes a male coupler 40 that is removably received within recess 34 of the female housing 32. The male coupler 40 includes a release pin 42. The male coupler 40 may be in the form of any desired known male coupler. The male and female couplers 30, 40 can be respectively in the form of male and female hydraulic couplers 30, 40.

The coupling device 12 provides a mechanical aid in ejecting the male coupler 40 in that as the mechanical ejector 38 is actuated, the mechanical ejector 38 slides relative to the female housing 32 to depress the release pin 42 of the male coupler 40, thereby relieving the recess 34 of pressure and allowing the male coupler 40 to be removed by an operator. Thereby, the mechanical ejector 38 axially moves at least a portion of the male coupler 40 away from the female housing 30. In this regard, the mechanical ejector 38 can be moved in between a neutral or resting position (FIG. 2) and an actuated position (FIG. 3). Additionally, the mechanical ejector 38 has a minimized profile so that the mechanical ejector 38 is within the overall envelope of the coupling device 12.

The mechanical ejector 38 includes a lever 44 pivotally connected to the female housing 32 at a first pivot point P1 and a rod 46 pivotally connected to the lever 44 at a second pivot point P2. In more detail, the top end of the rod 46 is pivotally connected to the distal, rearward end of the lever 44 and thereby the second pivot point P2 is located rearwardly of the first pivot point P1. When an operator actuates, for example applies a downward force "F" onto the proximal end of the lever 44 as shown in the actuated position, the distal end of the lever 44 moves upwardly which slides the rod 46 upwardly within the bore 36 to contact and depress the release pin 42 of the male coupler 40 (FIG. 3). The mechanical ejector 38 may also include a biasing member 48 within the bore 36 and coupled with the rod 46 for biasing the rod 46 downwardly in the neutral position. The biasing member 48 can be in the form of a coil spring 48 which is wrapped around the rod 46 and operably connected between and acting against the bore 36 and the rod 46.

Figure 4:
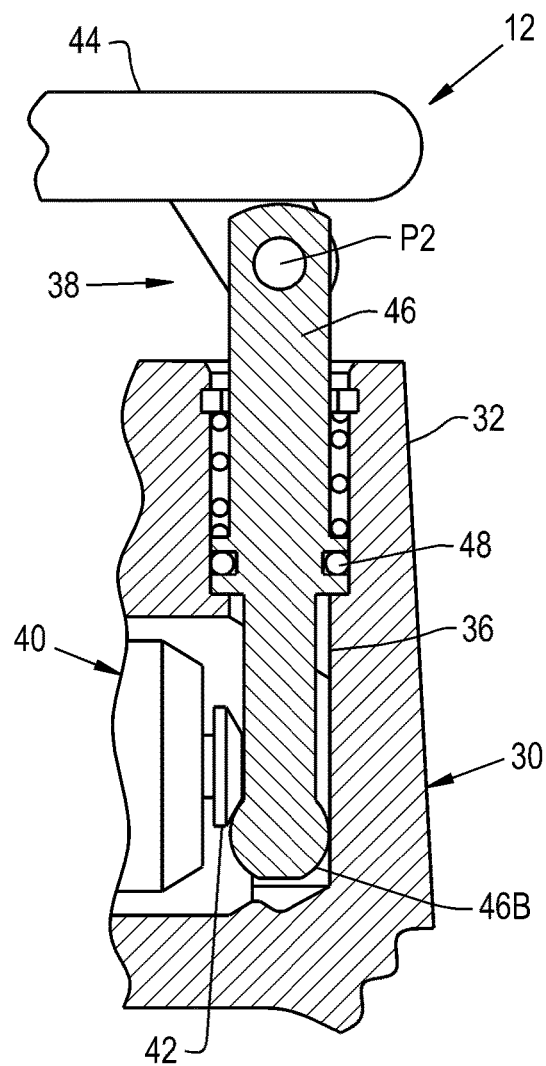
FIG. 4 illustrates a side view of the mechanical ejector in the neutral position, in accordance with an exemplary embodiment of the present invention.
Figure 5:
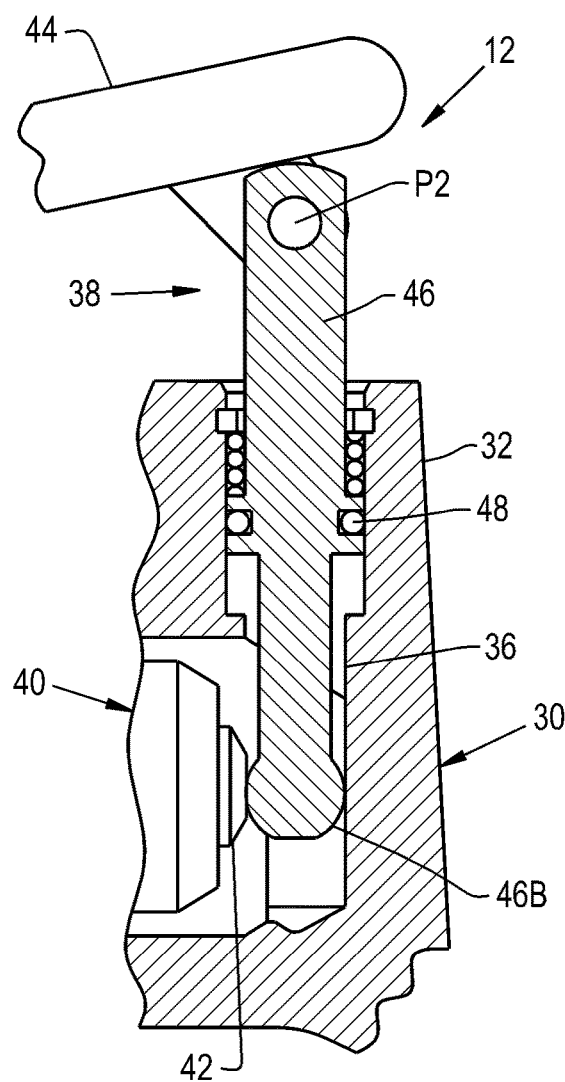
FIG. 5 illustrates a side view of the mechanical ejector in an actuated position, in accordance with an exemplary embodiment of the present invention.

Referring now collectively to FIGS. 2-5, there is shown the mechanical ejector 38 in more detail. The rod 46 has a generally cylindrically shape and a bulbous distal end 46B which contacts and depresses the release pin 42 when the rod 46 is moved upwardly by the lever 44 (FIGS. 3 and 5). Thereby, the release pin 42 is not actuated in the neutral position even though the release pin 42 may or may not contact the middle, cylindrical portion and/or the bulbous distal end 46B of the rod 46. As shown, the bulbous distal end 46B and the release pin 42 may be configured so that in the neutral position, the release pin 42 contacts at least a portion of both of the cylindrical portion of the rod 46 and the bulbous distal end 46B, but the bulbous distal end 46B does not depress the release pin 42 (FIG. 4). Hence, the mechanical ejector 38 does not interfere with the operation of the male coupler 40 unless and until the lever 44 is actuated. The rod 46 may travel vertically up and down a distance of approximately 3-5 inches, such as 4.95 inches.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A vehicle, comprising:
    a coupling device, including:
        a male coupler having a release pin;
        a female coupler having a female housing with a recess for removably connecting the male coupler, wherein the female housing has a bore; and
        a mechanical ejector moveably connected to the female housing and configured for depressing the release pin for ejecting the male coupler from the female housing, wherein:
            the mechanical ejector includes a lever pivotally connected to the female housing at a first pivot point and a rod pivotally connected to the lever at a second pivot point and configured for depressing the release pin of the male coupler,
            the rod is disposed and slides within the bore of the female housing, and
            the second pivot point is located rearwardly of the first pivot point such that as the lever is pushed downwardly, the rod is moved upwardly so that the rod depresses the release pin of the male coupler.

2. The vehicle of claim 1, wherein the rod has a bulbous distal end such that as the rod is moved upwardly the bulbous distal end depresses the release pin of the male coupler.

3. The vehicle of claim 2, wherein the mechanical ejector further includes a biasing member within the bore and operably connected to the rod for biasing the rod downwardly in a neutral position.

4. The vehicle of claim 3, wherein in the neutral position the release pin contacts at least a portion of the rod, but the bulbous distal end does not depress the release pin of the male coupler.

5. The vehicle of claim 1, wherein the bore is substantially perpendicular to the recess of the female housing.

6. A vehicle comprising:
    a coupling device, including:
        a male coupler having a release pin;
        a female coupler having a female housing with a recess for removably connecting the male coupler, wherein the male and female couplers are respectively in the form of male and female hydraulic couplers; and
        a mechanical ejector moveably connected to the female housing and configured for depressing the release pin for ejecting the male coupler from the female housing.

7. A coupling device for coupling a male coupler with a release pin, comprising:

a female coupler having a female housing with a recess configured for removably connecting the male coupler, wherein the male and female couplers are respectively in the form of male and female hydraulic couplers; and a mechanical ejector moveably connected to the female housing and configured for depressing the release pin for ejecting the male coupler from the female housing.

8. The coupling device of claim 7, wherein the mechanical ejector includes a lever pivotally connected to the female housing at a first pivot point and a rod pivotally connected to the lever at a second pivot point and configured for depressing the release pin of the male coupler.

9. The coupling device of claim 8, wherein the female housing has a bore and the rod is disposed and slides within the bore of the female housing.

10. The coupling device of claim 9, wherein the second pivot point is located rearwardly of the first pivot point such that as the lever is pushed downwardly, the rod is moved upwardly so that the rod is configured for depressing the release pin of the male coupler.

11. The coupling device of claim 10, wherein the rod has a bulbous distal end such that as the rod is moved upwardly the bulbous distal end is configured for depressing the release pin of the male coupler.

12. The coupling device of claim 11, wherein the mechanical ejector further includes a biasing member within the bore and operably connected to the rod for biasing the rod downwardly in a neutral position.

13. The coupling device of claim 12, wherein in the neutral position the release pin contacts at least a portion of the rod, but the bulbous distal end does not depress the release pin of the male coupler.

14. The coupling device of claim 10, wherein the bore is substantially perpendicular to the recess of the female housing.

15. A method, comprising the steps of:
providing a vehicle having a coupling device, the coupling device including a male coupler having a release pin, a female coupler having a female housing with a bore and a recess for removably connecting the male coupler, and a mechanical ejector including a lever pivotally connected to the female housing at a first pivot point and a rod pivotally connected to the lever at a second pivot point located rearwardly of the first pivot point and being disposed and slideable within the bore of the female housing;

moving the lever downwardly to correspondingly move the rod upwardly such that the rod depresses the release pin of the male coupler; and ejecting the male coupler from the female housing of the female coupler.

16. The method of claim 15, wherein the rod has a bulbous distal end such that as the rod is moved upwardly the bulbous distal end depresses the release pin of the male coupler.

* * * * *